United States Patent [19]

Hymel

[11] Patent Number: 6,008,739
[45] Date of Patent: Dec. 28, 1999

[54] INCREASING THE SIZE OF MEMORY AVAILABLE FOR STORING MESSAGES IN RESPONSE TO THE USER READING ADVERTISEMENTS IN A SELECTIVE CALL RECEIVER

[75] Inventor: James Allen Hymel, Lake Worth, Fla.

[73] Assignee: Motorola, Inc., Schaumburg, Ill.

[21] Appl. No.: 09/036,978

[22] Filed: Mar. 9, 1998

[51] Int. Cl.[6] ........................................... G06K 5/00
[52] U.S. Cl. ........................... 340/825.44; 455/38.4
[58] Field of Search ............................ 379/88.15, 170, 379/201, 217; 455/31.2, 426, 38.2, 38.4; 340/311.1, 825.26, 825.27, 825.33, 825.44, 825.48, 825.47; 705/4

[56] References Cited

U.S. PATENT DOCUMENTS

| | | | |
|---|---|---|---|
| 4,851,829 | 7/1989 | DeLuca et al. | 340/825.44 |
| 5,376,931 | 12/1994 | Marrs | 340/825.44 |
| 5,696,965 | 12/1997 | Dedrick | 707/10 |
| 5,870,030 | 2/1999 | DeLuca et al. | 340/825.44 |
| 5,892,456 | 4/1999 | Ishida | 340/825.44 |

OTHER PUBLICATIONS

Leibovich, M. 'Ad's Message: Talk Cheap Callers Endure Pitches, Phone for Free', Washington Post, Jan. 20, 1999, L Edition Section A p. A01, [retrieved on Apr. 5, 1999]. Retreived from: Dialog Information Services, Palo Alto, CA, USA. Accession No. 04236703, Jan. 1999.

'Broadpoint and Duquesne Enterprises Announce Free Long Distance Service in Pittsburgh, PA', Press Release [online], BroadPoint Communications Inc., 1999 [retrieved Apr. 5, 1999]. Retrieved from the Internet: <URL:http://www.broadpoint.com/news–final.html>, Apr. 1988.

Potts, J. 'Service Trades Long Distance, Adevertising Callers Earn Free Time Listening to Commerical', Press Release [online]. BroadPoint Communications Inc., 1999 [retr. Apr. 5, 1999]. Retr. from Internet: <URL:http://www.broadpoint.com/Pitt_tribune.html>, Apr. 1998.

*Primary Examiner*—Scott Weaver
*Assistant Examiner*—Roland R. Foster
*Attorney, Agent, or Firm*—Philip P. Macnak; John H. Moore

[57] ABSTRACT

A method of encouraging a user of a SCR (Selective Call receiver) (10) to read advertisements stored in the SCR (10). The user is provided with an initial level of access to a feature of the SCR that enhances the SCR's usefulness. When the user reads an advertisement, additional access to that feature is provided for a predetermined time period. Preferably, the feature is memory space, and each time the user reads an advertisement, the memory space available for storing messages is temporarily increased.

8 Claims, 4 Drawing Sheets

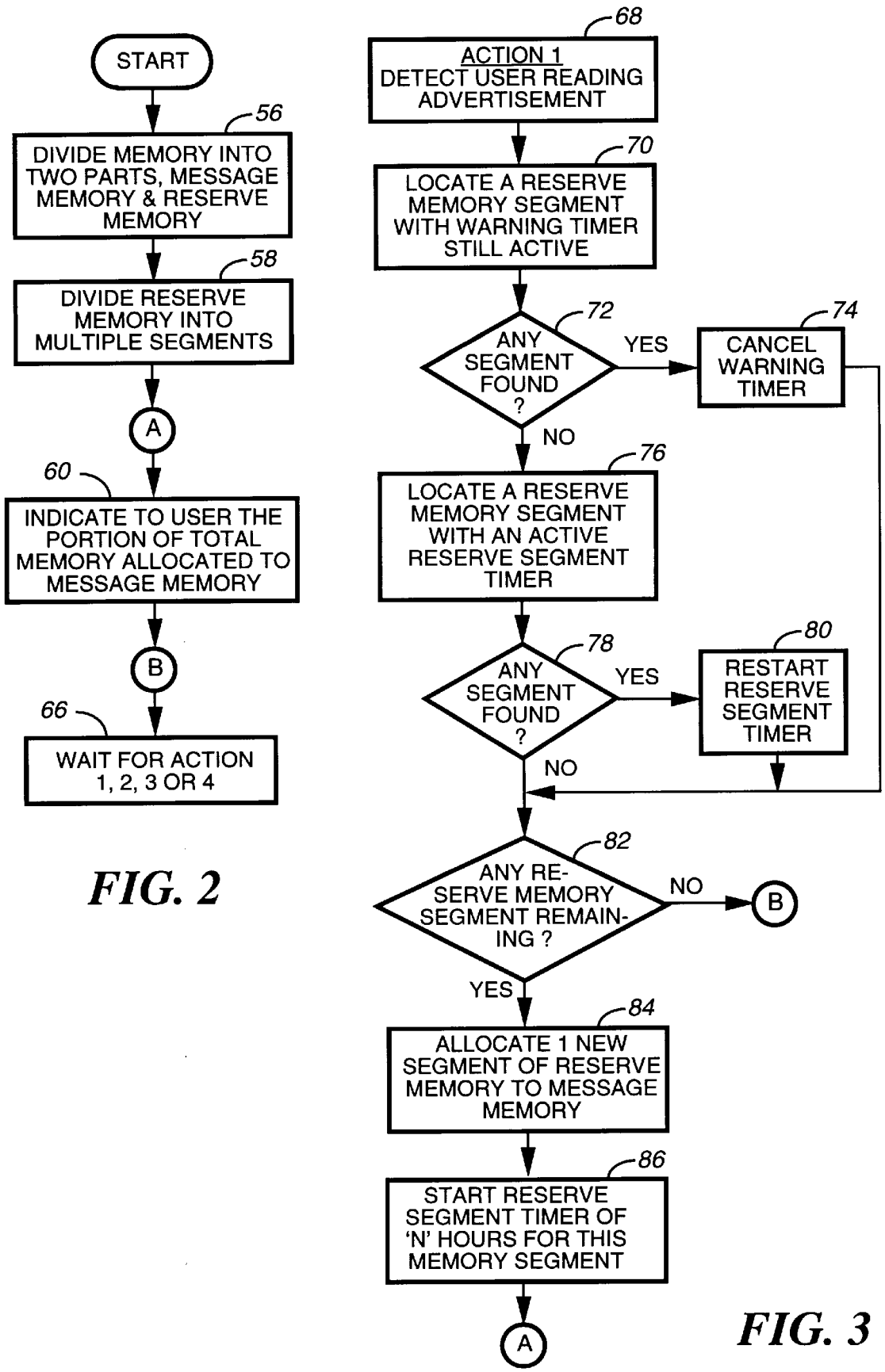

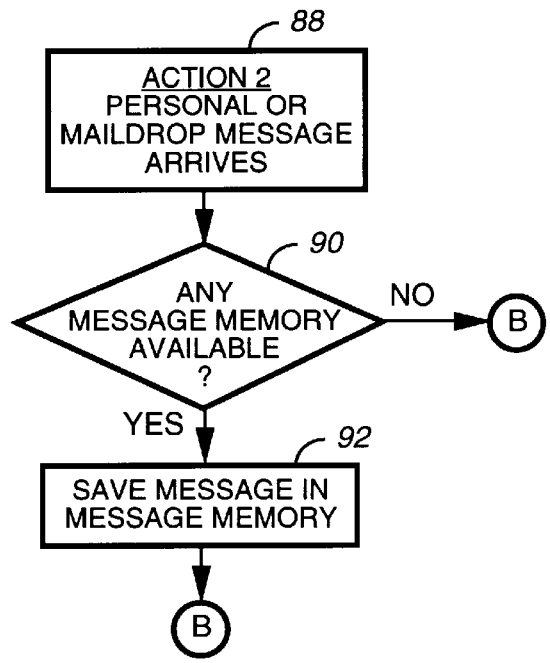
*FIG. 4*
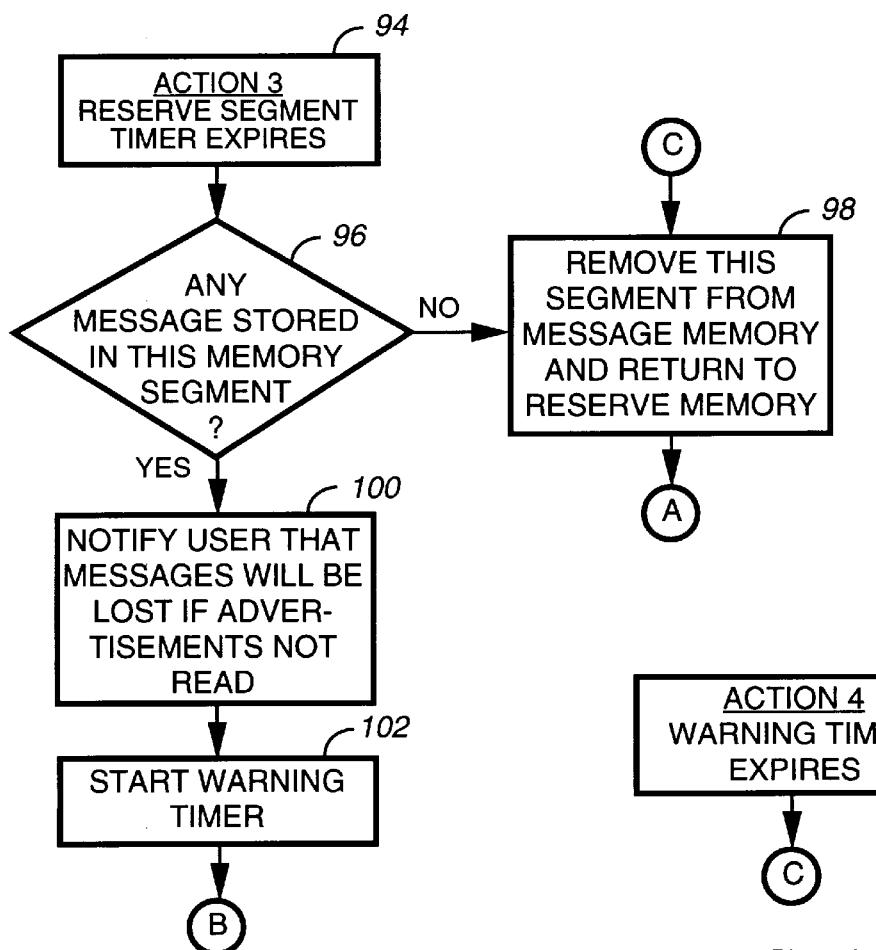
*FIG. 5*
*FIG. 6*
INCREASING THE SIZE OF MEMORY AVAILABLE FOR STORING MESSAGES IN RESPONSE TO THE USER READING ADVERTISEMENTS IN A SELECTIVE CALL RECEIVER

FIELD OF THE INVENTION

This invention is directed to SCR's (Selective Call Receivers) that receive personal messages and advertisements, and particularly to a method of encouraging a user of the SCR to read advertisements received by the SCR.

BACKGROUND OF THE INVENTION

In some messaging systems, SCR's are capable of receiving advertisements in addition to personal messages. Both the advertisements and the personal messages are transmitted by an operator of the messaging system to one or more SCR's that are subscribed to the messaging service. An SCR that receives an advertisement can display it whenever the user desires, and in the same manner as a personal message.

While a user of an SCR is likely to read his personal messages, he is less likely to read advertisements received by his SCR. If SCR users could be successfully encouraged to read more advertisements, or to read them more carefully, there would be an obvious benefit to advertisers who could justify spending more money on advertisements. The resulting increased income to the operator of the messaging system can also benefit the SCR users. The system operator can use that income to lower, or perhaps even eliminate, the monthly fees paid by his subscribers.

What is needed, therefore, is a way of successfully encouraging SCR users to read their advertisements. The form of encouragement used should provide, to the SCR user, a clearly visible reward for reading advertisements; in addition, the users must remain able to use their SCR's to read personal messages without undue restrictions or complications.

BRIEF DESCRIPTION OF THE FIGURES

FIGS. 2 through 6 are flow charts showing how the SCR's processor is programmed to control the operation of the SCR according to the invention.

DESCRIPTION OF THE PREFERRED EMBODIMENT

According to a broad aspect of the present invention, a user of a SCR is encouraged to read advertisements received by his SCR by controlling the user's access to a feature of the SCR. For example, a SCR such as a pager can have a number of desirable features that enhance the usefulness of the SCR to its user. Such features include memory space for storing incoming messages, the ability to provide different kinds of alerts for different categories of messages, the ability to receive special messages such as stock quotes, etc.

A SCR that operates according the invention provides, to its user, an initial level of access to a certain feature. In the embodiment discussed herein, that certain feature is memory space. The user's SCR makes available a certain amount (base amount) of memory space in which incoming messages can be stored. The larger the memory space, the more useful the SCR is to the user.

To encourage the user to read advertisements stored in his SCR, the SCR temporarily increases the amount of available memory space each time the user reads an advertisement. When the increased memory space has been made available for a predetermined period of time, the available memory space is reduced to its previous level. The advantages of this technique are discussed more fully later.

Figure 1:
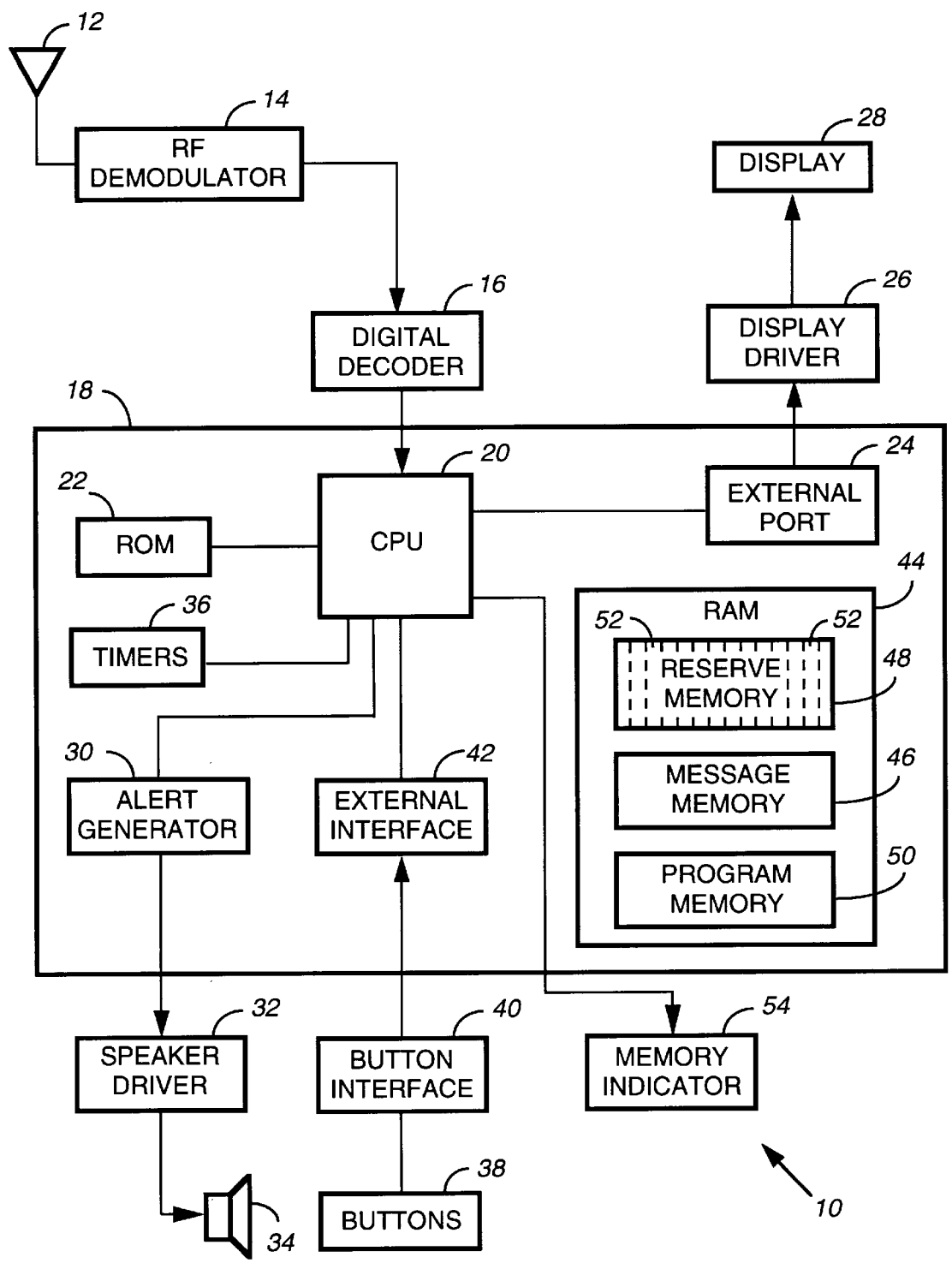
FIG. 1 is a block diagram of a SCR that operates according to the invention.

A selective call receiver that operates according to the invention is shown in FIG. 1 as a pager 10. The illustrated pager has circuitry including an antenna 12, an RF demodulator 14 and a digital decoder 16 for receiving and decoding incoming messages that include advertisements. Messages received by the antenna 12 are demodulated by the conventional demodulator 14 to provide demodulated analog data as an input to the decoder 16 which may also be of conventional construction.

The signal output from the decoder 16 is decoded digital data that is applied as an input to a processor 18 which may be, for example, a MC68HC05 made by Motorola, Inc. The processor 18 may also be conventional, but it is programmed to cause the pager 10 to operate according the invention, as discussed later.

The processor 18 includes a CPU (Central Processing Unit) 20 and a ROM (Read Only Memory) 22 which stores the instruction program for the CPU. The processor also includes an external port interface 24 for coupling signals from the CPU 20 to a display driver 26. The latter device drives a display 28, which may be a conventional liquid crystal display, for displaying decoded messages (including advertisements), menus, prompts, etc.

To generate a user alert upon receipt of a message, the CPU is coupled to an alert generator 30 whose output is coupled to the input of a speaker driver 32. A speaker 34 is coupled to the output of the driver 32 for generating an audible alert upon receipt of a message that is directed to the pager 10.

Timers 36 are coupled to the CPU 20 to give a time base for collecting data from the digital decoder (16) at precise intervals. They also keep time duration for alerts and possibly a real time clock for the user interface.

The user can control various functions of the pager by means of user actuatable buttons 38 that are coupled to the CPU via a button interface 40 and an external port interface 42. The buttons may be used to cause a received message to be shown on the display 28, to scroll through messages, and to exit reading messages.

The processor 18 also includes a RAM (Random Access Memory) 44 that comprises a message memory 46, a reserve memory 48 and a program memory 50. Preferably, the reserve memory 48 is divided into segments 52.

The program memory 50 acts as a scratch pad memory for temporary storage of new messages (before stored in message memory 46) or the results of computations made by the CPU 20.

The message memory 46 and the reserve memory 48 provide, under control of the CPU 20, key components for operating the pager 10 in accordance with the invention. In the illustrated embodiment, memory space is the SCR's feature to which the user has controlled access. The CPU 20 controls access to memory space per a software program stored in the program memory 50. A memory indicator 54 is included to show the user how much memory is available for storing messages.

The software program that is executed by the CPU 20 for controlling access to memory space is illustrated by the flow charts shown in FIGS. 2–6 which will now be discussed. After the "start" instruction (FIG. 2), there are two initializing steps 56, 58 that are executed only when the SCR is first powered up. In step 56, the memory structure that comprises the message memory 46 and the reserve memory 48 (FIG. 1) is divided into two parts. One part (message memory) stores incoming messages, and the other part (reserve memory) is held in reserve for possible allocation to the message memory. In the next step 58, the reserve memory 48 is divided into segments 52. In a typical SCR having 128 kb (kilo bytes) of memory, the message memory 46 can use 100 kb while 28 kb can be allotted to the reserve memory 48. One kb may be allotted to each memory segment 52. The remaining steps of the flow chart are executed while the SCR is in its normal mode of operation.

Figure 7:
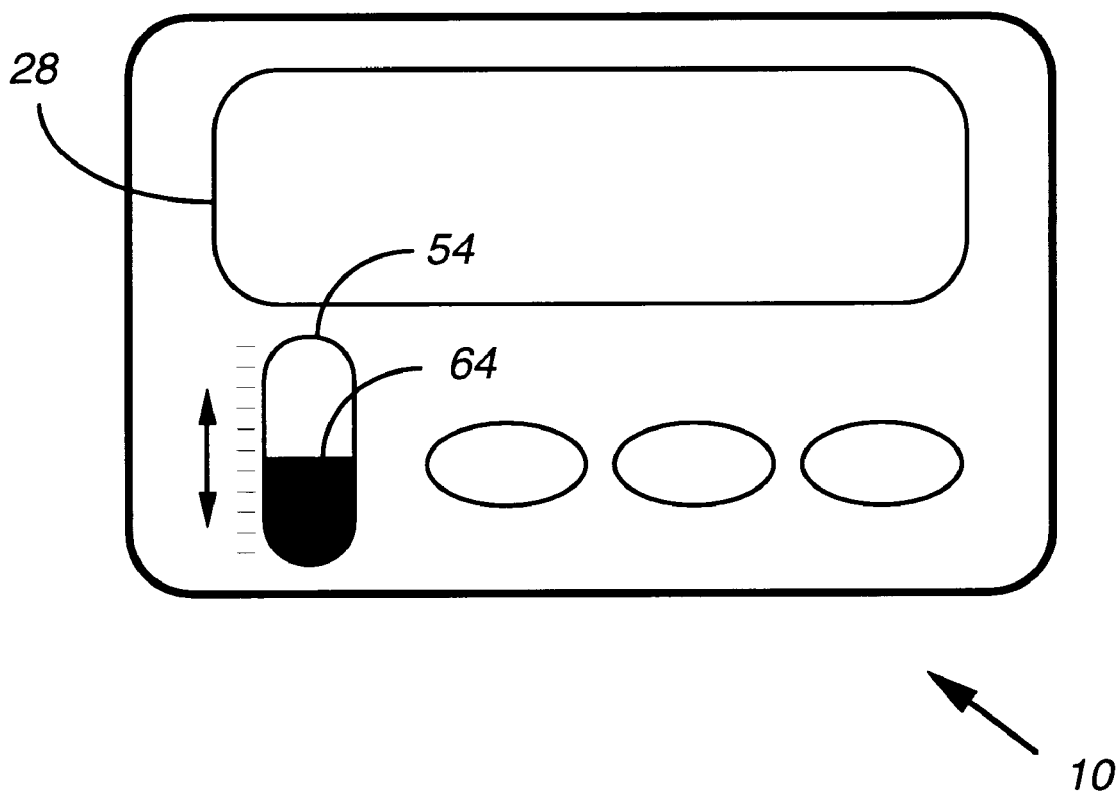
FIG. 7 is an external view of the SCR of FIG. 1, illustrating a mechanism for indicating how much memory space is available for storing incoming messages.

The program proceeds via entry point A to step 60 where the SCR is instructed to indicate, to the SCR user, how much of the total memory (message memory 46 plus reserve memory 48) is allocated to storing messages. Referring to FIG. 7, this indication may be given in a number of ways. For example, the SCR 10 may display a message on its display 28 indicating to the user that a certain percentage of memory space is available for storing messages. Alternately, the SCR 10 may include a memory indicator 54 in the form of a liquid crystal display that is shaped as a thermometer. A dark portion 64 of the memory indicator rises and falls, as controlled by the CPU 20, to indicate how much memory space has been allocated to storing messages.

Referring back to FIG. 2, the program proceeds from step 60 to step 66 via entry point B. At this step, the program waits for one of four possible actions to occur.

The first possible action is illustrated in FIG. 3 at step 68 where the SCR detects the user reading an advertisement stored in the SCR's memory. The program proceeds to step 70 where the SCR is instructed to locate a reserve memory segment (52, FIG. 1) having an active warning timer, i.e. a warning timer that has not expired.

There are two timers that are used in the program of FIGS. 2–6. One timer is referred to as a "reserve segment timer". It is a timer that is started when a memory segment 52 is allocated to the message memory 46. That allocation is for a predetermined period of time, e.g. hours or days, so that the allocation is terminated when the reserve segment timer expires, at which time the same memory segment is re-allocated to the reserve memory 48.

The second timer is referred to as a "warning timer". The purpose of this timer, which can run for minutes or hours, is to alert the user that a memory segment 52, having been temporarily allocated to the message memory, now stores a message and will shortly be re-allocated to the reserve memory (causing the message stored therein to be lost). This alerts the user so that he can read an advertisement before the warning timer expires; this will present the memory segment from being re-allocated to the message memory when the warning timer expires, thereby avoiding the loss of the message stored in that memory segment. Note that each memory segment 52 that becomes allocated to the message memory is timed separately, thus allowing each such segment to be individually removed from the message memory when its timed allocation has expired.

Returning to FIG. 3, step 72 asks whether the SCR has found a reserve memory segment for which a warning timer is active. If the answer is affirmative, this indicates that there is a message segment 52 which contains a stored message and which is soon to be re-allocated to the reserve memory, whereupon the program proceeds to step 74. Here, the warning timer for the found message segment is canceled, thereby renewing the temporary allocation of the same message segment to the message memory.

If the answer to step 72 is negative, the program proceeds to step 76 to locate a reserve memory segment with an active reserve timer (a segment that was previously allocated to the message memory, but its warning timer has not yet been activated). If such a segment is found (step 78), the program proceeds to step 80 where the reserve segment timer is re-started for that found segment. This action re-allocates that segment to the message memory for another predetermined period of time. After step 80, or if no message segments are found per step 78, the program proceeds to step 82.

The inquiry made at step 82 asks whether there are any memory segments 52 remaining in reserve, i.e., any segments in reserve memory 48 that can be allocated to the message memory. If the answer is negative, the program proceeds to step 66 (FIG. 2) via entry point B to await another action. If the answer is affirmative, the program proceeds to step 84.

Per step 84, one segment 52 of the reserve memory is allocated to the message memory. For the same segment 52, the reserve segment timer is started (step 86) to limit the allocation of the segment to "N" hours. The program then returns, via entry point A, to step 60 (FIG. 2) to indicate to the user the amount of memory space that is now allocated to message memory.

Assuming now that the SCR receives a message (FIG. 4-Action 2, step 88), the program advances to the next step 90 to determine whether there is sufficient space in the message memory 46 to store the received message. If the answer is affirmative, the message is saved in the message memory (step 92), and the program advances to step 66 (FIG. 2) to await the next action. If the answer to step 90 is negative, the received message may be discarded, and the program advances to step 66. Alternately, memory space may be made available to store the received message, and a warning issued to the user that no more memory space is available. Another alternative is to discard the oldest stored message and use its memory space to store the received message.

If the reserve segment timer expires for a segment 52 that has been allocated to the message memory (FIG. 5-Action 3, step 94), a determination is made as to whether there is any message stored in the same segment 52 (step 96). If the answer is negative, the program proceeds to step 98 where that segment is removed from the message memory and returned to the reserve memory. The program then returns to step 60 (FIG. 2) via entry point A to indicate how much message memory is available, and then to await another action (step 66).

If the answer at step 96 is affirmative, the program proceeds to step 100. Here, the SCR notifies the user that any messages stored in the segment whose reserve timer has expired will be soon lost if an advertisement is not read. This notification can be made by activating an audible alert on the SCR, by displaying an alert message on display 28, etc. The warning timer is started for the same segment at the next step 102, and the SCR then waits for the next action to occur (FIG. 2, step 66).

If a warning timer expires for a memory segment (FIG. 6-Action 4, step 104), the program proceeds via entry point C to step 98 in FIG. 5. This causes the memory segment to be re-allocated to the reserve memory 48.

With this invention, a user of the SCR is encouraged to read advertisements without unduly interfering with the SCR's normal mode of operation. A feature of the invention that is particularly useful is withdrawing a memory segment from the message memory after a predetermined period of time, and returning that segment to the reserve memory. This encourages the user to periodically read or re-read advertisements stored in his SCR, thus refreshing the user's recollection of the brand images conveyed by the advertisements. In addition, the amount of memory space allocated to storing incoming messages is reduced gradually if no advertisements are read. One memory segment at a time is withdrawn from the message memory as each segment's timer expires. This is preferable to abruptly reducing available memory space by a large amount, and possibly losing many stored messages.

Although the invention has been described in terms of a preferred embodiment, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a selective call receiver that receives messages, including advertisements, and that stores the messages in a memory which includes a first message memory portion having a predetermined size, and a second reserve memory portion, a method of changing the size of the memory that is available for storing the messages, comprising:

storing messages which are received in the first message memory portion, and storing additional messages within segments of the second reserve memory portion only when allocated for use with the first portion of memory;

in response to a user reading an advertisement stored therein, allocating a segment of memory from the second reserve memory portion to the first message memory portion for a predetermined time period, thereby temporarily enlarging the size of the first message memory portion to enable storage of additional messages;

after the predetermined time period has expired, removing the segment of memory allocated to the first message memory portion thereby reducing the size of the first message memory portion; and deleting from the segment of memory returned to the second reserve memory portion the messages stored therein.

2. The method as set forth in claim 1 further including returning the allocated segment of memory to the second reserve memory portion.

3. The method as set forth in claim 1 further including indicating to the user the amount of memory available in the first message memory portion.

4. The method as set forth in claim 1 further including prior to expiration of the predetermined time period, providing a warning to the user that the additional messages will be lost if an advertisement is not read during the predetermined time period.

5. The method as set forth in claim 1, further including, for each advertisement read by the user, allocating a segment of memory from the second reserve memory portion to the first message memory portion, and wherein the predetermined time period runs separately for each allocated segment of memory.

6. The method as set forth in claim 1 wherein the second reserve memory portion is divided into a plurality of segments of substantially equal size, and wherein one segment of memory is allocated to the first message memory portion in response to each advertisement that is read by the user.

7. In a selective call receiver that receives incoming messages, including advertisements, and that stores the messages in memory, a method of changing the size of the memory that is available for storing messages, comprising:

a) storing incoming messages in a first portion of the memory and storing additional messages in a second portion of the memory only when segments of the second portion of memory are allocated for use with the first portion of memory;

b) each time the user reads a stored advertisement, allocating a segment of memory from the second portion of the memory to the first portion of the memory, thereby enlarging the first portion of the memory;

c) measuring the amount of time that a segment of memory remains allocated to the first portion of the memory;

d) removing from the first portion of the memory the segment of memory that has been allocated to the first portion of the memory for a predetermined time period, and returning the segment of memory to the second portion of the memory;

e) deleting from the segments of memory returned to the second portion of the memory the messages stored therein; and f) indicating to the user the amount of memory available in at least the first portion of the memory.

8. A method as set forth in claim 7 wherein step f) includes generating a visual representation of the amount of memory available.

* * * * *